United States Patent

[11] 3,615,778

| [72] | Inventor | Robert E. Albert<br>Wilmington, Del. |
| --- | --- | --- |
| [21] | Appl. No. | 805,838 |
| [22] | Filed | Mar. 10, 1969 |
| [45] | Patented | Oct. 26, 1971 |
| [73] | Assignee | E. I. du Pont de Nemours and Company<br>Wilmington, Del. |

[54] PROCESS FOR THE PREPARATION OF MULLITE BONDED REFRACTORY MATERIALS
4 Claims, No Drawings

[52] U.S. Cl. .................................................. 106/65,
106/57, 106/67, 106/69
[51] Int. Cl. .................................................. C04b 35/16
[50] Field of Search ............................................. 106/65, 67,
69, 57; 23/110

[56] References Cited
FOREIGN PATENTS

| 1,311,664 | 10/1962 | France .......................... | 106/69 |
| --- | --- | --- | --- |
| 1,123,547 | 8/1968 | Great Britain ................ | 106/67 |

*Primary Examiner*—James E. Poer
*Attorney*—Lynn N. Fisher

ABSTRACT: A process for making (1) a mullite binder precursor powder, (2) mullite, and (3) mullite bonded refractory materials is disclosed. The contribution to the art lies in the discovery that mullite can be made by firing a dry mixture of silica and aluminum chlorhydroxide at temperatures ranging from 1,050° C. to 1,300° C.

PROCESS FOR THE PREPARATION OF MULLITE BONDED REFRACTORY MATERIALS

DESCRIPTION OF THE INVENTION

This invention is directed to a process for making a mullite binder precursor, mullite, and mullite bonded refractory materials.

Mullite bonded refractory articles are known in the art. Generally, these are made by using as the binder precursor a mixture of clay ($SiO_2$) and alumina ($Al_2O_3$) in the mullite ratio (2:3). The binder precursor is generally mixed with a suitable refractory powder and fired to at least about 1,500° C. This process is unsatisfactory because it requires special furnaces to withstand the high temperatures needed to accomplish bonding of the refractory powders.

This invention employs as a binder precursor a mixture of aluminum chlorhydroxide [$Al_2(OH)_5Cl$] and silica. Mullite bonded refractory articles can be made from this binder precursor at firing temperatures between 1,050° C. and 1,300° C. These low temperatures permit the use of conventional, low-cost, refractory-lined furnaces and to a large degree eliminate breakage of refractory articles during firing.

The invention thus relates to the following subject matter:
1. A method for making a dry mullite precursor powder by mixing at high shear rates one part, based on $SiO_2$, of an aqueous silica sol with from 1.10 to 1.75 parts of aluminum chlorhydroxide in aqueous solution and thereafter removing any water therefrom;
2. A method for making mullite by mixing at high shear rates one part, based on $SiO_2$, of an aqueous silica sol with from 1.10 to 1.75 parts of aluminum chlorhydroxide in aqueous solution; removing any water therefrom; and firing the product at a temperature of from 1,050° C. to 1,300° C. until mullite is formed;
3. A method for making a mullite bonded refractory material by mixing at high shear rates one part, based on $SiO_2$, of an aqueous silica sol with from 1.10 to 1.75 parts of aluminum chlorhydroxide in aqueous solution to make a precursor; removing any water therefrom; mixing a refractory powder with the precursor (either before or after the water is removed therefrom); and firing the product at a temperature of from 1,050° C. to 1,300° C. until mullite is formed.
4. A dry mullite precursor powder consisting essentially of one part of silica and 1.10 to 1.75 parts of aluminum chlorhydroxide.

STARTING MATERIALS

Any aqueous silica sol can be used in the process of this invention. Suitable silica sols for use in the process of this invention are disclosed in the following U.S. patents:

| | |
|---|---|
| Bird | 2,244,325 |
| Bechtold et al. | 2,574,902 |
| Iler | 2,668,149 |
| Alexander | 2,913,419. |

Particularly suitable silica sols are "Ludox" LS and "Ludox" HS 40, both manufactured by E. I du Pont de Nemours & Co. "Ludox" LS is a 30 percent aqueous colloidal silica, based on $SiO_2$; has a $SiO_2:Na_2O$ ratio of 285:1; and has an average particle size of 15 μ. "Ludox" HS 40 is a 40 percent aqueous colloidal silica, based on $SiO_2$; has a $SiO_2:Na_2O$ ratio of 95:1; and has an average particle size of 15 μ.

Aluminum chlorhydroxide, [$Al_2(OH)_5Cl$], is known in the art and is available commercially as a 50 percent by weight aqueous solution from Reheis Chemical Co., a division of Armour Pharmaceutical Co., Chicago, Illinois. Aluminum chlorhydroxide can be made generally speaking by deionizing a dilute solution of hydrated aluminum chloride [$AlCl_3 \cdot H_2O$] with an $OH^1$ form of an anion exchange resin to exchange five chlorine ions for five hydroxy ions per two $Al^{+++}$ ions and thereafter heating the treated solution to its boiling point for a period of time sufficient to form a stable, soluble, nongelling material. The aluminum chlorhydroxide is preferably used in the form of an aqueous solution.

The sols should contain aluminum chlorhydroxide and silica in such quantities that the mole ratio of

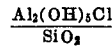

is between 3.5:2.0 to 2.2:20. A sol having a ratio of 3.0:2.0 is preferred since this will result in a $Al_2O_3$ to $SiO_2$ ratio in the exact mullite ratio of 3.0:2.0.

Sols having 9 percent to 60 percent by weight of nonvolatile material, calculated as $SiO_2$ and $Al_2(OH)_5Cl$, should be used in the processes of this invention. At concentrations greater than 60 % by weight of nonvolatiles gels are formed. If sols having less than 9% by weight of nonvolatiles are used, excessive amounts of water will have to be evaporated during later use.

In preparing mullite bonded refractory materials, any suitable refractory grain may be used. Preferred refractory grains are made from mullite, alumina, zirconia, zircon, silica, and mixtures thereof. Generally, the mullite bonded refractory will constitute from 5–25 %, and preferably 5–15 %, by weight mullite from the binder precursor and from 95–75 %, and preferably 95–85 %, by weight refractory grain. Any convenient particle size of refractory grain may be used, but generally particle sizes between eight to 325 mesh are preferred.

PROCESS CONDITIONS

The first step in making mullite by the process of this invention constitutes the preparation of a sol mixing an aqueous silica sol and aluminum chlorhydroxide. If the solids content of the sol based on the weight of silica and aluminum chlorhydroxide is about 25 % or below, the ingredients may be mixed in any order at high shear rates. If the solids content is above about 25 %, then the silica sol must be added to highly agitated aluminum chlorhydroxide in order to prevent gelling. High shear rates can be provided by any suitable mixing device. It has been found, for example, that a household Waring Blender provides suitable shear rates and agitation.

If a precursor powder is desired, water may be removed from the sol by evaporation. When the powder is to be used, it is merely redissolved in water and coated on the refractory grain or is mixed with the refractory grain prior to firing.

In preparing either mullite or mullite bonded refractory articles, the water from the binder must be removed before firing since failure to do so will result in large cavities due to rapidly escaping steam. Water may be removed by conventional techniques, such as by low pressure evaporation. When a precursor in the form of a sol is used, water can be removed either before or after addition of the refractory grain.

Any suitable furnace capable of providing 1,050°–1,300° C. can be used to accomplish firing. If a particular shaped article is desired, it should be formed prior to firing by any convenient technique such as cold pressing, ramming, slipcasting, or even molding by hand. A shaped article cannot be made from pure mullite precursor powder because excessive shrinkage will occur as the aluminum chlorhydroxide converts to $Al_2O_3$. The article is fired at 1,050°–1,300° C. until the mullite binder phase forms throughout the entire structure. Normally a firing of about 4 hours or more is required. The mullite structure in the binder phase can be detected by X-ray diffraction analysis.

EXAMPLES

The invention will be better understood by reference to the following examples wherein parts are by weight unless indicated to the contrary.

EXAMPLE 1

Several ingredients are prepared as follows:

Ingredient A 31 parts of "Ludox" HS 40 is mixed with 219 parts of water. The pH of the sol is 9.8.

Ingredient B 31 parts of "Ludox" HS 40 is mixed with 219 parts of water. The pH of the sol is adjusted with nitric acid to 1.5.

Ingredient C 42 parts of "Ludox" LS is mixed with 208 parts of water. The pH of the sol is 9.8.

Ingredient D 42 parts of "Ludox" LS is mixed with 208 parts of water. The pH of the sol is adjusted with nitric acid to 1.5.

Ingredient E

Ingredient E is 127.2 parts of a 50% aqueous solution of aluminum chlorhydroxide.

The following ingredients are mixed at high shear rates for ¼ to 1 min. in a Waring Blender to prepare clear sols having a solid content of 02.2% based on $SiO_2$ and $Al_2(OH)_5Cl$.

| Sample | Ingredient in Blender | Ingredient Added to Ingredient in Blender |
|---|---|---|
| 1 | E | A |
| 2 | E | B |
| 3 | A | E |
| 4 | B | E |
| 5 | E | C |
| 6 | E | D |
| 7 | C | E |
| 8 | D | E |

The example illustrates that at low solids, the order of addition of the ingredients and the pH of the silica sol are not critical to the preparation of clear sols.

EXAMPLE 2

This example illustrates the critical order of addition of silica sol to aluminum chlorhydroxide at high solids levels. Ingredient F is 133.3 parts of "Ludox" LS having a pH of 9.8. Ingredient G is 100 parts of "Ludox" HS 40 having a pH of 9.8.

Ingredient H 31 parts of "Ludox" HS 40 is mixed with 94 parts of water. The pH of the sol is 9.8.

Ingredient I 31 parts of "Ludox" HS 40 is mixed with 144 parts of water. The pH of the sols is 9.8.

Ingredient J

Ingredient J is 408 parts of a 50 % aqueous solution of aluminum chlorhydroxide.

Ingredient K

Ingredient K is 127.2 parts of a 50 % aqueous solution of aluminum chlorhydroxide.

The ingredients are mixed at high shear rates in a Waring Blender as follows. The appearance and the solids content of the sol, based on $SiO_2$ and $Al_2(OH)_5Cl$, are noted.

| Sample | Ingredient in blender | Ingredient[1] | Appearance of sol | Solids content |
|---|---|---|---|---|
| 9 | J | F | Milky—no gel | 45.0 |
| 10 | F | J | Hard gel | 45.0 |
| 11 | J | G | Milky—no gel | 48.0 |
| 12 | G | J | Hard gel | 48.0 |
| 13 | J | H | Slightly cloudy | 40.6 |
| 14 | H | J | Hard gel | 40.6 |
| 15 | K | I | Clear | 25.2 |
| 16 | I | K | Gel | 25.2 |

[1] Added to ingredient in blender.

The samples indicate that a sol is obtained only when the silica sol is added to a solution of the aluminum chlorhydroxide when the solids is over 25 % by weight.

EXAMPLE 3

This examples illustrates the production of mullite from the sols of:
1. Sample 8, Example 1;
2. Sample 13, Example 2; and
3. Sample 15, Example 2.

The 3 sols are dried at 30°–60° C. for 6 hours. Thereafter they are heated according to the following schedule:

| | |
|---|---|
| 1. 27° C. to 600° C. | 1 hour |
| 2. Hold at 600° C. | 4 hours |
| 3. 600° C. to 840° C. | 1 hour |
| 4. Hold at 840° C. | 4 hours |
| 5. 840° C. to 1,050° C. | 1 hour |
| 6. Hold at 1,050° C. | 4 hours |
| 7. 1,050° C. to 1,225° C. | 1 hour |
| 8. Hold at 1,225° C. | 4 hours |

After firing at 600° C., 840° C., 1,050° C., and 1,225° C., the phase is determined by X-ray diffraction.

PHASE BY X-RAY DIFFRACTION

| Source | 600° C. | 840° C. | 1,050° C. | 1,225° C. |
|---|---|---|---|---|
| Sample: | | | | |
| 8 | Amorphous | Mostly amorphous | Mullite[1] | Mullite. |
| 13 | do | do[1] | Mullite[1] | Do. |
| 15 | do | do[1] | Mullite[1] | Do. |

[1] Trace $\gamma$-$Al_2O_3$.

EXAMPLE 4

This example illustrates the drying of a sol to produce dry mullite precursor solids.

A large quantity of sol is made by mixing together eight separate batches of sol, each batch being made as follows:
200 grams of 50 % by weight solution of aluminum chlorhydroxide is mixed with 200 grams of water and is placed in an "Osterizer" blender. To this is added 47 grams of "Ludox" HS 40 diluted with 600 grams of water. The resulting sol is clear and contains no gel particles or precipitate.

The final sol contains 800 grams of aluminum chlorhydroxide and 150 grams of silica solids. This sol is evaporated under 25 mm. Hg. absolute in a flash evaporator using water at about 50° C. to heat the evaporator. About 90 % of the water is thus removed to produce a viscous water white sol which contains about 62 % solids.

The viscous sol is transferred to a shallow pan and dried in an air circulating oven at 50° C. until no further weight loss is observed. The dry binder precursor thereafter recovered is glass clear solids.

EXAMPLE 5

This example illustrates the use of the mullite binder precursor for bonding refractory powders.

Refractory A 366.7 grams of the dried mullite binder precursor of example 4 is thoroughly mixed with 2,200 grams of zircon grain having an average particle size of −325 mesh. The mixture is then mixed with sufficient water to produce a thick slurry. Wax forms are repeatedly dipped into the slurry and dried until a dried shell of about ⅛ inch thickness on the wax form is prepared. The coated wax forms are then heated to melt and remove the wax, leaving a mold with an internal configuration identical to that of the original wax form. Thus, the mold is produced by what is known as the "lost wax process" or more commonly known today as the precision investment casting shell mold process.

The resulting mold is then fired at 1,200° C. for 6 hours to produce a mullite bonded zircon body containing 12 % by weight mullite binder phase.

Refractory B 579.4 grams of the dried mullite binder precursor of example 4 is thoroughly mixed with 1,300 grams of silica grain having an average particle size of −200 mesh. The refractory is then shaped by the "lost wax process" as in the case of refractory A. The resulting mold is then fired at 1,200° C. for 6 hours to produce a mullite bonded silica body containing about 19.5% by weight mullite binder phase.

EXAMPLE 6

This example shows the use of the mullite binder precursor as a binder for alumina and mullite refractory grain.

Preparation of Alumina Grain

To 165 parts of T-61 tabular alumina (−325 mesh) and 165 parts of T-61 tabular alumina (−100 mesh) is added 181.2 parts of a mullite precursor binder sol containing 59% solids prepared by mixing 375 parts of an aqueous colloidal silica (40 % $SiO_2$) with 1,526.4 parts of a 50% aqueous solution of aluminum chlorhydroxide. The solution is flash evaporated to a solids content of 59% by weight of silica and aluminum chlorhydroxide. The mixture is stirred for several minutes in an "Osterizer" blender to produce a damp grain mixture.

Preparation of Mullite Grain

To 335 parts of mullite grain (−200 mesh) is added 61.0 parts of the above-mentioned mullite binder precursor.

The mixture is then stirred for several minutes in an "Osterizer" blender to produce a damp grain mixture.

Drying

Both the alumina and mullite products are dried at 105° C. until no weight loss is noticed.

Firing

Several bars were cold pressed and fired as indicated to give the following results.

| Sample | Grain | Molding pressure, p.s.i. | Bar size inches | Firing temperature, ° C. | Binder in fired sample, weight percent | Transverse bend strength, p.s.i. |
|---|---|---|---|---|---|---|
| 17 | $Al_2O_3$ | 4,000 | ½ x ½ x 4 | 1,100 | 15 | 1,150 |
| 18 | $Al_2O_3$ | 8,000 | ½ x ½ x 4 | 1,100 | 15 | 2,070 |
| 19 | $Al_2O_3$ | 12,000 | ½ x ½ x 4 | 1,100 | 15 | 1,800 |
| 20 | Mullite | 4,000 | ½ x ½ x 4 | 1,100 | 5 | 1,750 |
| 21 | Mullite | 8,000 | ½ x ½ x 4 | 1,100 | 5 | 1,900 |
| 22 | Mullite | 12,000 | ½ x ½ x 4 | 1,100 | 5 | 1,750 |

These strengths compare favorably with refractory ceramics produced in conventional processes using these grains. However, firing temperatures were about 450°–500° C. lower than those required by conventional processes.

Utility

The processes of this invention make possible the production of mullite bonded refractories in conventional refractory equipment designed for maximum temperatures of 1,300° C. or less. The products are useful as refractories and have good thermal shock resistance. Alumina and/or mullite bonded with the mullite binder is useful at temperatures up to 1,550°–1,600° C. The refractories are useful as kiln furniture, refractory brick, and burner blocks.

I claim:
1. A method for making a mullite bonded refractory comprising the steps of:
   1. preparing a sol having a solids content in excess of about 25% by adding at high shear rates one molar proportion, based on $SiO_2$, of an aqueous silica sol to from 1.10 to 1.75 molar proportions of aluminum chlorhydroxide; and
   2. mixing from 5–25% by weight, based on solids, of the products of step (1) with from 75–95% by weight of a refractory grain;
   3. removing any water from the product of step (2); and
   4. firing the product of step (3) at a temperature of from 1,050° to 1,300° C. until a mullite bonded refractory is formed.
2. A method for making a dry mullite precursor powder consisting essentially of one molar proportion of silica and from 1.10 to 1.75 molar proportions of aluminum chlorhydroxide, said method comprising the steps of:
   1. preparing a sol having a solids content in excess of about 25% by adding at high-shear rates one molar proportion, based on $SiO_2$, of an aqueous silica sol to from 1.10 to 1.75 molar proportions of aluminum chlorhydroxide; and
   2. removing any water from the sol.
3. A method of making mullite comprising firing the dry mullite precursor made by the process of claim 2 at a temperature of from 1,050° C. to 1,300° C. until mullite is formed.
4. A method of making a mullite-bonded refractory comprising the steps of:
   1. mixing from 5–25% by weight of the dry mullite precursor made by the process of claim 2 with from 75–95% by weight of a refractory grain; and
   2. firing the product of step 1 at a temperature of from 1,050° to 1,300° C. until a mullite-bonded refractory is formed.

* * * * *